J. V. BRUNER.
CLUTCH OPERATING AND HOLDING DEVICE.
APPLICATION FILED SEPT. 8, 1919.
1,375,895.
Patented Apr. 26, 1921.
2 SHEETS—SHEET 1.
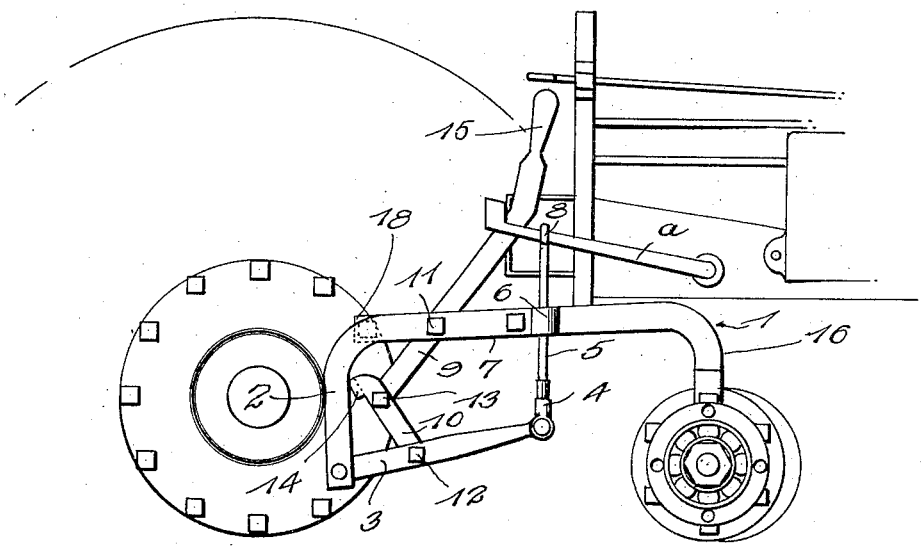
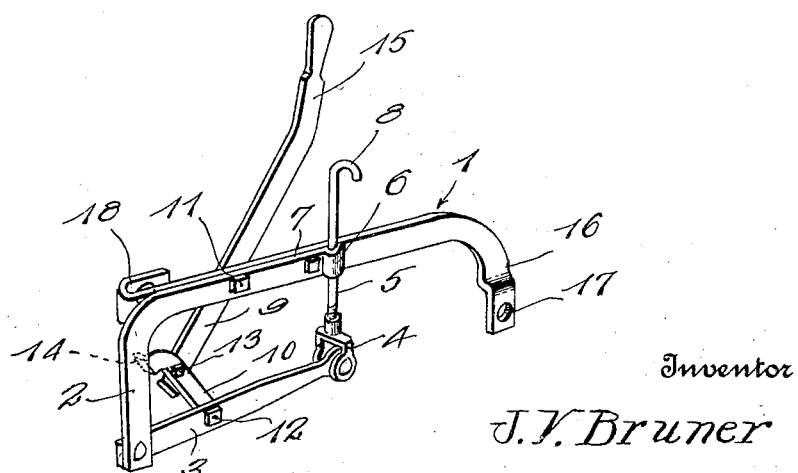
Witness
George H. Govanjette
Inventor
J. V. Bruner
By H. B. Willson &co
Attorneys

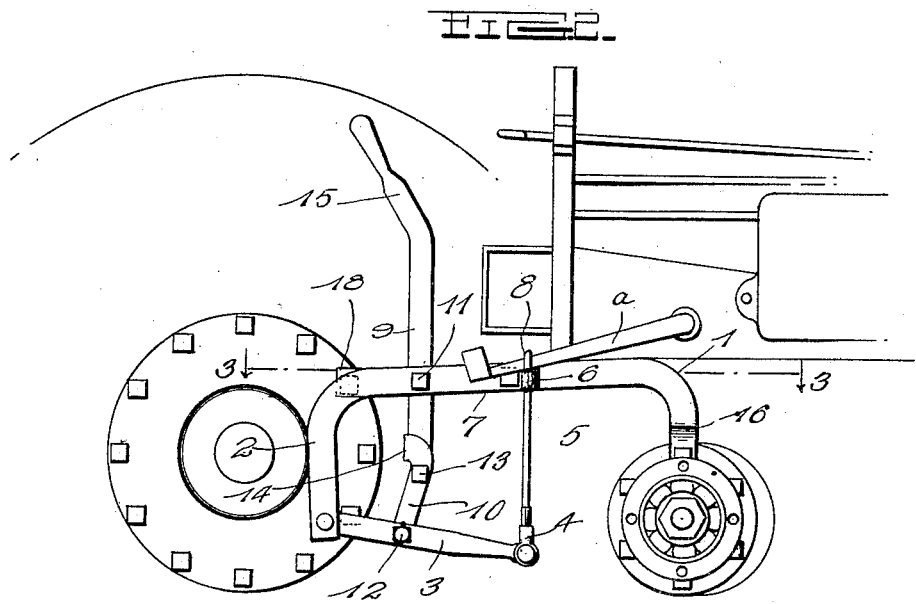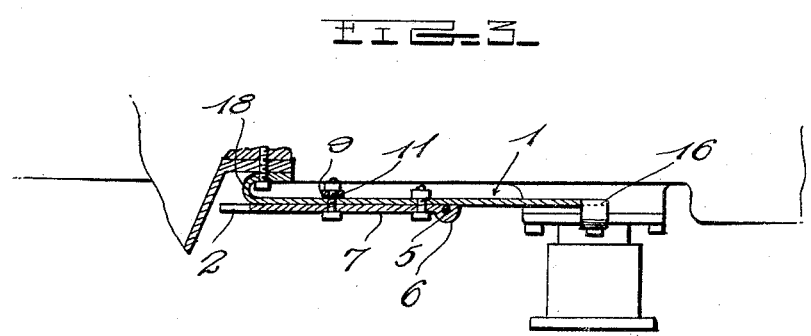

UNITED STATES PATENT OFFICE.

JOSEPH V. BRUNER, OF DAVID CITY, NEBRASKA, ASSIGNOR TO EDWARD L. SPATZ, OF BRUNO, NEBRASKA.

CLUTCH OPERATING AND HOLDING DEVICE.

1,375,895.  Specification of Letters Patent.  Patented Apr. 26, 1921.

Application filed September 8, 1919. Serial No. 322,339.

*To all whom it may concern:*

Be it known that I, JOSEPH V. BRUNER, a citizen of the United States, residing at David City, in the county of Butler and State of Nebraska, have invented certain new and useful Improvements in Clutch Operating and Holding Devices; and I do declare the following to be a full, clear, and exact description of the invention, such as will enable others skilled in the art to which it appertains to make and use the same.

This invention relates generally to motor vehicle appliances, but more particularly to clutch operating and holding attachments for motor vehicles.

The primary object of the invention is to provide a motor vehicle having a clutch pedal which is overbalanced to clutch applied position with an attachment including a hand-operated lever connected in such a manner with the clutch pedal of the vehicle so that when it is moved it will move the clutch pedal to its clutch releasing position and will hold it in such position until the lever is moved to its other position.

Another object of the invention is to provide a device of this class which will be comparatively simple, strong, durable and inexpensive in construction, and which will be efficient and reliable in operation and well adapted to the purpose for which it is designed.

With these and other objects in view, the invention consists of certain novel features of construction and the combination and arrangement of parts as will be hereinafter fully described and claimed.

In the accompanying drawings forming a part of the application and in which similar reference characters designate like parts throughout the several views.

Figure 1 is a front elevation of a device constructed in accordance with this invention, showing it applied to a tractor, the clutch pedal of the latter being shown in clutch applied position;

Fig. 2 is a similar view showing the clutch pedal being held by the attachment in clutch released position;

Fig. 3 is a sectional view taken on the line 3—3 of Fig. 2; and,

Fig. 4 is a perspective view of the device detached from the tractor.

The attachment consists of an inverted U-shaped frame 1 having pivoted to one of its end portions 2 at one end a lever 3. The other end of the lever 3 is pivotally connected to a yoke 4 to which is threaded a link 5. This threaded connection between the lower end of the link 5 and the yoke 4 provides for a longitudinal adjustment of the link. The link 5 is slidably mounted or guided in a guide 6 formed at the intermediate portion 7 of the frame 1. The upper end of the link 5 carries a projection here shown in the form of an integrally formed hook 8.

The numerals 9 and 10 represent a pair of toggle links, the link 9 being fulcrumed at 11 to the intermediate portion 7 of the frame 1 while the link 10 is fulcrumed at 12 to the lever 3 at a point intermediate of the ends of the latter. The inner ends of the links 9 and 10 are pivotally connected together as at 13, and the link 10 is provided with a laterally extending projection 14 disposed in offset relation to the adjacent edge of this link so as to engage the edge of the link 9 and limit the relative movement of the two links after they have been swung so that the pivot 13 has passed beyond the line disposed between the fulcrums 11 and 12. The link 9 is extended beyond its fulcrum 11 to form a handle 15.

The other end portion 16 of the frame 1 is provided with an opening 17 through which a bolt or screw is to be extended to attach this end of the frame to a stationary part of the tractor. The frame 1 is made of two L-shaped sections having their long arms fastened together to form the intermediate portion 7. One end of one of these sections is bent backward to form a small U-shaped bracket 18 which is bolted to another stationary portion of the tractor. This forms the means for securely fastening the frame to the tractor, it being placed in such a position that the hook 8 will overhang the clutch pedal *a*. This clutch pedal *a*, it will be understood, is overbalanced by suitable means to clutch applied position and when pressure is applied to the same it will be swung into clutch released position. The link 5 is adjusted with respect to the yoke 4 so that it barely touches the upper edge of the pedal *a* when the latter is in its clutch applied position.

With the parts in this position as shown in Fig. 1 of the drawings, and it is desired to release the clutch it is only necessary to grasp the handle 15 and swing it rearwardly to the position shown in Fig. 2 of the drawings. The toggle links 9 and 10 will be swung so as to swing the lever 3 downwardly and cause a downward sliding movement of the link 5. This consequently in turn pulls down on the pedal $a$ and moves it to its clutch released position. After the pivot 13 connecting the links 9 and 10 has moved beyond the line between the fulcrums 11 and 12 of the links, the latter will be thereby locked in this position and the pedal $a$ will be held in its released position against its overbalancing means. To return the parts to the positions shown in Fig. 1 it is only necessary to move the handle 15 in a forward direction.

The device is particularly applicable for use on a tractor as illustrated in the drawings, for when a tractor is being driven up or down a hill and the engine is stalled or the driver wishes to bring the tractor to a stop, it is only necessary to operate the handle 15 so as to shift the clutch to its released position and leave the gear shift lever unmolested, the gears in the intermission being engaged act as brakes and hold a tractor from moving forward or backward. When it is desired to transmit power from the tractor by means of a belting, one man may easily connect the belt to the tractor and tighten it by first operating the device to throw the clutch in released position, placing the belt upon its pulleys, and then move the handle 15 so that the clutch will be placed in clutched position to move the tractor until the belt is tight. After that the gear shift lever is to be placed in neutral position so that power will be applied to the pulley.

Even though the device is particularly designed for attachment to a tractor, it is to be understood that it may be just as readily applied to other types of motor vehicles, and inasmuch various changes in form, proportion, and in the minor details of construction may be resorted to without departing from the spirit of the invention, I do not wish it to be limited other than as set forth in the claims.

What is claimed is:—

1. An attachment of the class described comprising a frame, a lever fulcrumed to said frame, a link connected to said lever and adapted to engage the clutch pedal of a motor vehicle, and toggle links connected to said frame and said lever, one of said toggle links being provided with a handle extension.

2. An attachment of the class described comprising a frame, a lever fulcrumed at one end to said frame, a link slidably mounted upon said frame and connected at one end to the other end of said lever, the other end of said link being adapted to engage the clutch pedal of a motor vehicle, and toggle links connected to said frame and the intermediate portion of said lever, one of said toggle links being provided with a handle.

3. An attachment of the class described comprising an inverted U-shaped frame, a lever pivoted at one end to one of the end portions of said frame, a guide fixed to the intermediate portion of said frame, a link slidably mounted in said guide and connected at one end to the other end of said lever, the other end of said link having a hook adapted to engage the clutch pedal of a motor vehicle, and toggle links connected to said frame and the intermediate portion of said lever, one of said toggle links being extended beyond its fulcrum to said frame to form an operating handle.

4. The combination with a motor vehicle having a clutch pedal overbalanced to clutch applied position, of a lever fulcrumed to a stationary part of the vehicle, a link connected to said lever and having a portion positioned for engagement with said pedal so as to move the same into clutch released position, and toggle links connected to a stationary part of the vehicle and said lever for swinging the latter, one of said toggle links being provided with a handle.

5. The combination with a motor vehicle having a clutch pedal overbalanced to clutch applied position, a lever fulcrumed at one end to a stationary part of the vehicle, a guide mounted upon said vehicle, a link slidable in said guide and connected at one end to the other end of said lever, a projection carried by the other end of said link and positioned for engagement with said pedal to move the same to clutch released position, and toggle links connected to a stationary part of said vehicle and the intermediate portion of said lever for swinging the latter, one of said toggle links being extended beyond its fulcrum to form an operating handle.

6. In a motor vehicle, the combination of a foot actuated clutch pedal overbalanced to clutch applied position, a hand actuated lever, and means connecting said clutch pedal with said lever for moving said pedal by hand to clutch released position and holding it in said position.

In testimony whereof I have hereunto set my hand.

JOSEPH V. BRUNER.